United States Patent
Latsha et al.

(10) Patent No.: US 10,405,186 B1
(45) Date of Patent: Sep. 3, 2019

(54) SYSTEMS AND METHODS FOR INDEPENDENT MULTI-CHALLENGE MULTI-LEVEL AUTHENTICATION

(71) Applicant: UIPCO, LLC, San Antonio, TX (US)

(72) Inventors: Noel Robert Latsha, San Antonio, TX (US); William Rudolph Wolf, San Antonio, TX (US); Benjamin Van Ruitenbeek, San Antonio, TX (US); Marcus Pierce Jameson, San Antonio, TX (US); Dereck Marsh Henson, New Braunfels, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 16/153,478

(22) Filed: Oct. 5, 2018

Related U.S. Application Data

(60) Provisional application No. 62/568,728, filed on Oct. 5, 2017.

(51) Int. Cl.
| | |
|---|---|
| *H04W 12/08* | (2009.01) |
| *H04W 12/06* | (2009.01) |
| *G06F 21/31* | (2013.01) |
| *H04W 12/12* | (2009.01) |
| *H04L 29/06* | (2006.01) |
| *H04W 8/18* | (2009.01) |
| *G06F 21/45* | (2013.01) |

(52) U.S. Cl.
CPC ............ *H04W 12/08* (2013.01); *G06F 21/31* (2013.01); *G06F 21/45* (2013.01); *H04L 63/083* (2013.01); *H04L 63/308* (2013.01); *H04W 8/183* (2013.01); *H04W 12/06* (2013.01); *H04W 12/12* (2013.01)

(58) Field of Classification Search
CPC ..... H04W 12/08; H04W 8/183; H04W 12/12; H04W 12/06; G06F 21/45; G06F 21/31; H04L 63/308; H04L 63/083
See application file for complete search history.

(56) References Cited

U.S. PATENT DOCUMENTS

| | | | |
|---|---|---|---|
| 9,667,610 B2 * | 5/2017 | Theebaprakasam | .... H04L 63/08 |
| 2011/0310787 A1 * | 12/2011 | Sheriff | ................... H04W 76/15 |
| | | | 370/315 |

* cited by examiner

*Primary Examiner* — Chuong A Ngo
(74) *Attorney, Agent, or Firm* — Eric L. Sophir; Dentons US LLP

(57) ABSTRACT

Embodiments disclosed herein describe multi-challenge, multi-level authentication systems, methods and products. Each authentication challenge may be independent of other challenges and may be associated with a particular network resource or functionality. Counters may track the number of attempts for each authentication challenge and each type of network resource and functionality. Each authentication challenge, network resource, or network functionality may be independently locked and unlocked based on the attempts tracked by the counters. Furthermore, the authentication system may configure the authentication challenges hierarchically, and a higher level challenge may unlock a locked lower level challenge. Therefore, embodiments disclosed herein significantly improve upon the conventional all-in/all-out binary authentication systems and methods.

20 Claims, 3 Drawing Sheets

SYSTEMS AND METHODS FOR INDEPENDENT MULTI-CHALLENGE MULTI-LEVEL AUTHENTICATION

CROSS REFERENCE TO RELATED APPLICATIONS

This application claims priority to U.S. Provisional Application No. 62/568,728, filed Oct. 5, 2017, which is hereby incorporated in its entirety by reference.

TECHNICAL FIELD

This application relates generally to authentication systems and methods and more specifically to multi-challenge multi-level authentication systems and methods.

BACKGROUND

Conventional authentication systems for computer networks offer limited flexibility. Such authentication systems are typically engineered around a binary total-access-granted/total-lock-out paradigm. If a user presents correct credentials to an authentication system, the user is granted access to the associated computer network. However, if the user fails to provide the correct credentials for a set number of times, the user is locked out of the computer network. Once locked out of the computer network, the user may have to request a credential reset (for example, a password reset) such that the user may establish a new set of credentials for accessing the computer network. Therefore, when a user is locked out in the conventional authentication systems, generating and transmitting new sets of credentials is cumbersome and time consuming. Furthermore, the conventional binary access-granted/locked-out approach grants access to or locks a user from the entire computer network and/or the communication channels. For example, a conventional authentication system for a website either grants access to a user to the entire website or locks the user out from the entire website. Furthermore, the conventional authentication system either authenticates the user to access the website from all channels, for example, a desktop computer-based browser or a mobile-based browser; or restricts the user from accessing the website from all channels.

SUMMARY

What is therefore desired is a flexible multi-challenge, multi-level authentication infrastructure that allows for each authentication challenge to be independently locked or unlocked. Furthermore, what is needed is an authentication infrastructure wherein each authentication challenge is tied to a network resource or a network functionality such that access to each network resource or functionality can be independently locked or unlocked.

The systems and methods disclosed herein are intended to address the aforementioned shortcomings in the conventional attempts, and provide additional or alternative benefits as well. More specifically, embodiments of the systems and methods detailed herein describe a multi-challenge, multi-level authentication system or infrastructure wherein each authentication challenge may be locked or unlocked independently. Moreover, each authentication challenge may be tied to a particular network resource or functionality such that access to each network resource or functionality can be independently controlled. Furthermore, the authentication system may configure the authentication challenges hierarchically in multiple levels such that a lower level locked authentication challenge may be unlocked by a hierarchically upper level successful authentication challenge response. The systems and methods disclosed herein therefore significantly improve upon the conventional all-in/all-out binary authentication systems and methods.

In an embodiment, a computer implemented authentication method comprises receiving, by a computer, a first network access credential from a user device associated with a user attempting to access one or more network resources; in response to the computer determining that the first network access credential does not match a corresponding credential associated with the user stored in an authentication database: incrementing, by the computer, a first counter associated with the first network access credential and associated with the user; in response to the computer determining that the first counter has not exceeded that maximum number of attempts associated with the first network access credential and associated with the user: transmitting, by the computer, a prompt to the user device, wherein the prompt is configured to indicate to the user to enter a new first network access credential; in response to the computer determining that the first counter has exceeded the maximum number of attempts associated with the first network access credential and associated with the user: enabling, by the computer, a lock associated with the first network access credential to prohibit the user device from accessing the one or more network resources; querying, by the computer, the authentication database to determine whether the user is associated with a second network access credential; transmitting, by the computer, a prompt for the user to input the second network access credential in response to determining that the user is associated with the second network access credential; and in response to the computer determining that the first network access credential matches the corresponding credential associated with the user and stored in the authentication database: enabling, by the computer, the user device to access the one or more network resources.

In another embodiment, system comprises a non-transitory storage storing an authentication database; a processor electrically coupled to the non-transitory storage medium and configured to: receive a first network access credential from a user device associated with a user attempting to access one or more network resources; in response to the processor determining that the first network access credential does not match a corresponding credential associated with the user stored in the authentication database: increment a first counter associated with the first network access credential and associated with the user; in response to the processor determining that the first counter has not exceeded that maximum number of attempts associated with the first network access credential and associated with the user: transmit a prompt to the user device, wherein the prompt is configured to indicate to the user to enter a new first network access credential; in response to the processor determining that the first counter has exceeded the maximum number of attempts associated with the first network access credential and associated with the user: enable a lock associated with the first network access credential to prohibit the user device from accessing the one or more network resources; query the authentication database to determine whether the user is associated with a second network access credential; transmit a prompt for the user to input the second network access credential in response to determining that the user is associated with the second network access credential; and in response to the processor determining that the first network access credential matches the corresponding credential associated with the user and stored in the authentication database: enable the user device to access the one or more network resources.

BRIEF DESCRIPTION OF THE DRAWINGS

The accompanying drawings constitute a part of this specification and illustrate embodiments of the subject matter disclosed herein.

DETAILED DESCRIPTION

Figure 1:
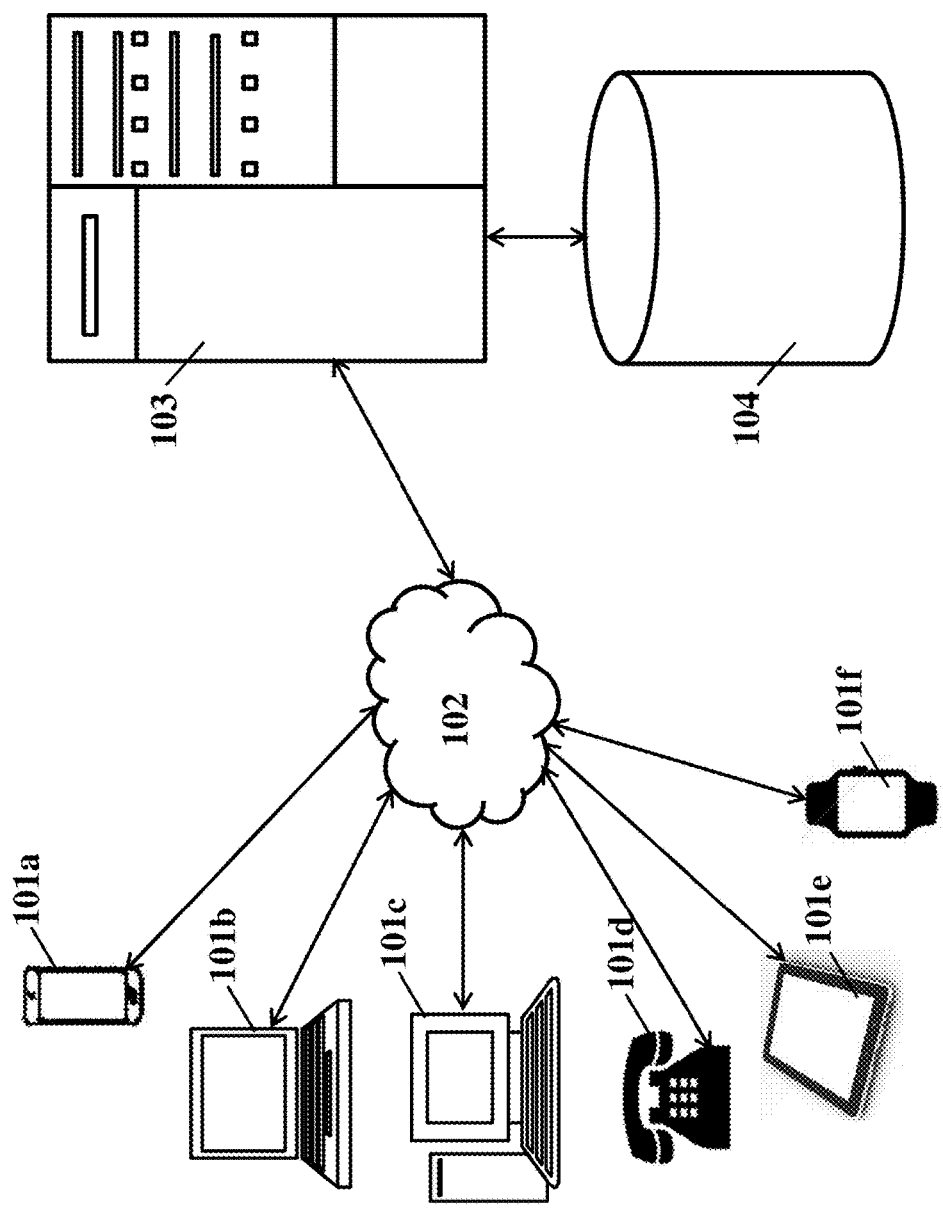
FIG. 1 shows an illustrative multi-challenge multi-level authentication system, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Embodiments disclosed herein describe independent multi-challenge, multi-level authentication systems, methods, and products that break the conventional total-access-granted/total-lock-out paradigm. More specifically, the authentication system disclosed herein includes multiple, hierarchically arranged authentication challenges. The authentication system may independently associate each of the authentication challenges with a network resource and/or a network functionality. For example, the authentication system may allow a user to access a website hosted by a server in the computer network when the user provides a password, but may not allow a user to make a withdrawal from an account using the password. For such withdrawal, the authentication system may require a response to another authentication challenge, such as the user providing a fingerprint. In other words, the authentication system may implement separate and independent authentication challenges for each of the network resource or functionality the user is attempting to access.

As used herein, an authentication challenge (also referred to herein as challenge) may refer to a technical authentication challenge-response implementation. An authentication challenge may refer to, for example, a password, a fingerprint, a voice recognition, a token, or other biometric or identity requirement. The authentication challenges may be categorized into different types of factors. One or more of the multiple authentication challenges may be knowledge factors (e.g., what the user knows). For example, a user's password or PIN may be a knowledge factor. One or more authentication challenges may be possession factors (e.g., what the user has or possesses). For example, a user may possess a token with information used to authenticate the user, and the token may be a possession factor. One or more authentication challenges may be inherent factors (e.g., what the user is). For example, a fingerprint or a retina scan may be an inherent factor. In short, an authentication factor may be a grouping of authentication challenges according to function. In a multi-challenge authentication system a combination of these types of challenges may be implemented. Unlike the conventional systems, wherein there is a complete access lock, embodiments present herein enable a challenge lock wherein access to network resources associated with the locked challenge is prohibited. In other words, in contrast to conventional systems that lock a user, embodiments disclosed herein lock one or more authentication challenges and not the user. For example, if a monetary transfer between two accounts is associated with a fingerprint; a fingerprint lock may prevent the user from making a monetary transfer without limiting the user's access to other network resources. In some embodiments, the authentication system may arrange the authentication challenges arranged based upon their security and significance; for example, a higher order authentication challenge may be more secure than a lower order factors. In such embodiments, if a higher order authentication challenge is locked, the lower order authentication challenge hierarchically below the locked higher order authentication challenge may be locked as well.

As mentioned above, the independent authentication challenges may allow the authentication system to associate each authentication challenge with a network resource or functionality. The authentication system may associate the challenges based on inputs from the user or network activity of multiple users. Furthermore, the authentication system may implement challenge specific locks based upon user inputs or network activity of multiple users. A user may indicate to the authentication system that a particular communication channel or network functionality should be more secure. Accordingly, the authentication system may associate the particular channel or functionality with a higher level authentication challenge. In some embodiments, the user may indicate that he may not use a channel as well; in such embodiments, the authentication system may lock the channel to preempt a fraudulent use. In other embodiments, the user may not have a particular channel or network functionality for a long time and the authentication system may implement a higher level authentication challenge to that channel or network functionality.

Furthermore, as mentioned above, each authentication challenge is independent and can be locked independently. Locking an authentication challenge may restrict or lock access to the channel, network resource, or network functionality associated with the authentication challenge. It should therefore be understood that locking an authentication challenge or locking a network resource, network functionality, or channel associated with the authentication challenge may be used interchangeably. The authentication system may enable the locks based on the user's inputs or network activity by the user. For example, a user may indicate to the authentication system that user will not do a wire transfer, and the authentication system may accordingly enable a lock on wire transfers. The authentication system may also track network activity associated with the user's account and determine whether to enable a lock based on the network activity. For example, the authentication system may determine that that there have been multiple transfers from the user's bank account within a short span of time. Based on this determination, the authentication system may enable a lock on transfers for the purpose of preempting potential fraudulent activities. As another example, the authentication system may determine that a particular challenge has been responded to incorrectly multiple times attempting access network resources associated with the particular challenge. Based on this determination, the authentication system may lock the particular challenge until the associated user unlocks a higher challenge and resets that particular challenge through alternate channels. Based upon the significance of the network resources, the authentication system may require different levels and/or different types of unlocking mechanisms. For example, if a user is password locked to access the website, the authentication system may require a PIN to unlock the password. However, if the authentication system determines a potential fraudulent activity in transfers of monetary amount and in response locks a user's bank account, the authentication system may require multiple unlocking mechanisms (such as a fingerprint scan and a retina scan) to unlock the user's bank account.

The locks or restrictions described herein may correspond to a specific network resource or specific network functionality. For example, within a user account, the authentication system may implement multiple locks such as a lock on account access, lock on making a transfer, and/or lock on specific types of transactions. As another example, in a website, the authentication system may implement a lock for specific portions of the website. For instance, a user may have a read access without a write access to the first portion of a website, but may have both read and write access to a second portion of the website.

For the purpose of enabling a lock, the authentication system may associate a counter with each challenge, each channel, each type of network resource the user may access, and/or each type of network activity the user may perform. Using the counter, the authentication system may count the number of corresponding unsuccessful attempts. For example, a fraud flags counter may count and keep track of the number of fraud flags generated in a user account based on the activities on the user account. As another example, a transaction attempts counter may count and keep track of the number of unsuccessful attempts associated with a user account. It should be understood that these counters are merely illustrative, and the authentication system may implement other counters that are to be considered within the scope of this disclosure. In some embodiments, the systems and methods described herein may modify the counter based upon the user activity. For example, the system may determine that 95% of the users get a credential right in three attempts, and, based on this determination, the system may set the counter to 4.

In some embodiments, systems and methods disclosed herein may determine whether or not to lock network resources and network functionalities based upon multiple counters. For example, even though the system may determine that the maximum number of attempts has not been reached for every single counter, the system may determine that the portions of the network should be locked based on aggregating the number of attempts from multiple counters. In some embodiments, the systems and methods may implement a point system to unlock a locked credential. For example, a lower level credential may require five points for unlocking. The system may determine that the requisite five points has been reached based on receiving a single higher level credential associated with five or more points. Alternatively, the system may determine that the requisite five points has been reached based on receiving multiple higher level credentials wherein the points associated with these higher level credentials aggregate to five. In some embodiments, the system may limit the number of higher level credentials for aggregating points: the system may aggregate points from only two higher level credentials and may not aggregate points from more than two higher level credentials.

The authentication system may modify one or more authentication challenges and/or counters based on network access and behavior of one or more users. For example, the authentication system may incorporate machine learning and artificial intelligence to track user behavior. For instance, for a user who accesses the associated network from multiple locations, the authentication system may increase the maximum number of attempts allowed from different locations. As a counter example, for a more sedentary user as ascertained from the user's behavior, the authentication system may decrease the maximum number of attempts allowed from different locations.

FIG. 1 shows an illustrative authentication system 100, according to an embodiment. The system 100 may comprise one or more client devices 101, one or more servers 103, and one or more databases 104. The client devices 101 and the servers 103 may communicate with each other through a communication medium 102, such as the internet. It should be understood that the system 100 and the shown components are merely illustrative; and one or more components may be added to or subtracted away from the system 100 without deviating from the scope of this disclosure. The client devices 101 may be any type of computing devices used by one or more users of the system 100. Non limiting examples of client devices 101 may be a smartphone 101a, a laptop computer 101b, a desktop computer 101c, a telephone 101d, a tablet computer 101e, and a smartwatch 101f.

The communication medium 102 may include any type of communication medium, including wired and wireless communication medium. In some embodiments, the communication medium 102 may include the internet or any other type of wide area network (WAN). In other embodiment, the communication medium 103 may include a local area network (LAN). However, it should be understood that the aforementioned communication medium are merely illustrative and other form of communication media may be within the scope of the disclosure.

The servers 103 of the system 100 may execute various software modules that may instruct the servers 103 on performing one or more processes for receiving data from various devices, storing the received data in the databases 104, retrieving the stored data in the databases 104, and performing various operations on the stored data. A server 101 may be any computing device comprising non-transitory machine-readable storage media and a processor capable of executing the various processes and tasks described herein. Non-limiting examples of a server 101 may include a server computer, a desktop, a laptop, a tablet, or the like. In some cases, the server 101 may be coupled to the databases 102 of the system 100, and, in some cases, the server 101 may host the one or more databases 102.

In operation, the servers 102 may receive an authentication request from a user through a client device 101. The authentication request may include an authentication credential associated with an authentication challenge. If the server 103 determines that the authentication credentials match the corresponding entries in the database 104 within a threshold number of attempts, the authentication system 100 may allow the user to access associated network resources or functionalities through the user device 101. If however the server 103 determines that authentication credential does not match the corresponding entries in the database 104, the authentication system 100 may not allow the user to access the associated network resources or functionalities and may prompt the user to enter another credential associated another authentication challenge.

Figure 2:
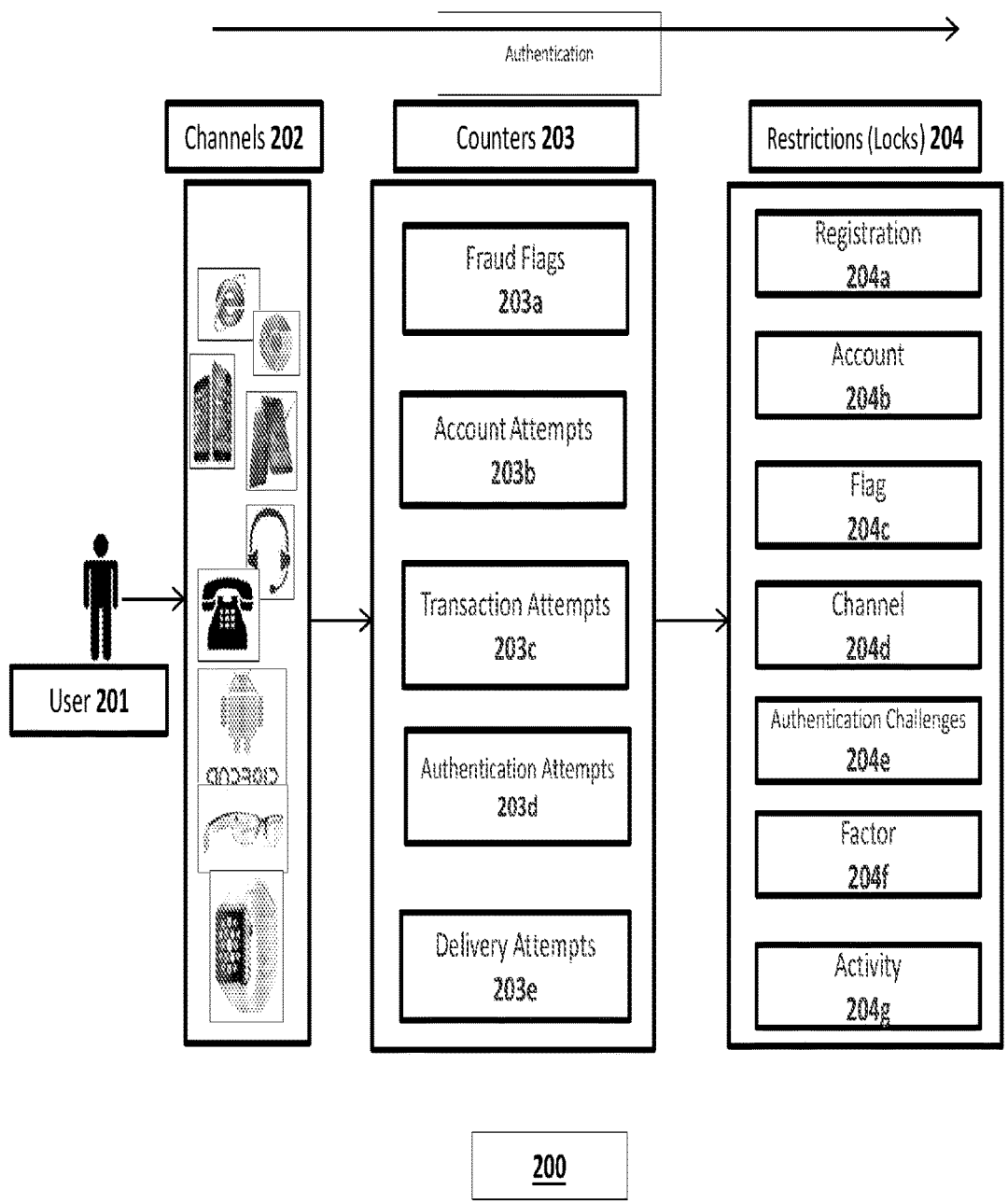
FIG. 2 shows an illustrative multi-challenge multi-level authentication system, according to an embodiment.

FIG. 2 shows an illustrative system 200 for multi-challenge, multi-level authentication, according to an embodiment. The illustrative system 200 may comprise one or more channels 202, one or more counters 203, and one or more restrictions (locks) 204. As shown in FIG. 2, the system 200 may be used by a user 201 for a multi-challenge, multi-level authentication. The system 200 may be a part of a computer network comprising one or more servers and one or more client devices. It should be understood that the components shown in the system 200 are merely illustrative, and one or more components can be added to or subtracted from the system 200 without a departure from the scope of this disclosure. It should further be understood that the authentication system may be used to authenticate one or more users to an associated computer network.

The one or more channels 202 may comprise communication/access media used by the user 201 for authenticating himself/herself to access a computer network. The one or more channels 202 may comprise a desktop based browser, such as Internet Explorer®, or Google Chrome®; or the smartphone/tablet based counterparts. Using the browser, the user 201 may access the authentication system 200 associated with the aforementioned computer network. The one or more channels 202 may also include a telephone or voice communication in general. Using the voice communication, the user 201 may communicate with an agent, or a computer based voice processing and response system to authenticate himself. The voice communication channel may also be referred to as a mobile channel. Additionally, the one or more channels 202 may include other forms of communications such as smart glass or a smartwatch. It should be understood that the aforementioned channels are merely illustrative and other channels of authentications are within the scope of the disclosure.

The one or more counters 203 may keep track of the number of attempts made by the user 201 for authenticating himself through the authentication system 200. Non-limiting examples of the one or more counters 203 are fraud flags counter 203a, account attempts counter 203b, transaction attempts counter 203c, authentication attempts counter 203d, and delivery attempts counter 203e. In some embodiments, the fraud flags counter 203a may keep track of the number of fraud flags generated by the user 201 based on one or more login attempts. For example, the fraud flags counter 203a may count a fraud flag generated by system 100 when a transaction conducted by the user 201 exceeds a threshold amount. The fraud flags 203a may track the number of times the system 200 has generated a fraud flag based on the user 201 transacting an amount above a threshold. In other embodiments, the fraud flags counter 203a may operate not as a counter but may provide a business logic check. For example, the fraud flags counter 203a may execute a business logic check to determine whether a customer account is delinquent and generate a fraud flag based on such determination. It should be understood that the word counter may refer to a software module, a hardware module, or a combination of both and may perform additional and alternative functions as well.

The account attempts counter 203b may keep track of the number of times the user 201 has attempted to login to or access his user account. In other words, the account attempts counter 203b may count and aggregate the number of unsuccessful attempts by the user 201 to login to his account. The transactions attempts counter 203c may keep track of the number of times the user 201 has attempted to conduct a transaction. The transaction may include, for example, a deposit of money to a user account, a withdrawal of money from the user account, and/or a transfer of money between multiple user accounts. In some cases, the system 200 may reject a request for a transaction by the user 201 and the transaction attempts counter 203c may keep track of the rejections. The authentication attempts counter 203d may track of the number of times the user has attempted an authentication. In other words, the authentication attempts counter 203d may count and aggregate the number of unsuccessful attempts to authenticate the user. The delivery attempts counter 203e may track and count the number of times the authentication system attempts to deliver pieces of information during authentication. For example, the delivery attempts counter 203e may count the number of times the authentication system has attempted to push a text message with a verification code to the user's phone. The delivery attempts counter 203e may therefore pre-empt a denial of service attack against the authentication system or the user's system. It should be understood that these counters are merely illustrative, and other counters are to be considered within the scope of this disclosure.

The authentication system 200 may further comprise one or more restrictions (or locks) 204. The restrictions 204 may include a registration restriction 204a, an account restriction 204b, a flag restriction 204c, a channel restriction 204d, an authentication challenges restriction 204e, a factor restriction 204f, and an activity restriction 204g. It should be understood that the authentication system 200 may implement the locks 204 as a software module, as a hardware module, or as a combination of both hardware and software modules.

The registration restriction 204a may lock a user from registering himself to a service provided by the computer network associated with the authentication system 200. For example, if the computer network is hosting a banking server, the registration restriction 204a may prohibit the user from creating an account with the banking server. The account restriction 204b may lock a user from conducting one or more activities associate with an existing account. The flag restriction 204c may lock a user from accessing an account based on any fraud flags associated with the account. For example, the authentication system 200 may determine one or fraud flags associated with fraudulent activity such as an account take over, identity theft, and delinquency; and restrict the user from accessing the account based on the fraud flags. The channel restriction 204d may lock a user from accessing the computer network through a channel. For example, the channel restriction 204d may lock the user from accessing the computer network from a smartphone browser. As another example, the channel restriction 204d may lock the user from performing any account activity on the website channel, or may lock the user 201 from using the telephonic channel to contact a customer service representative. The authentication challenge restriction 204e may lock a user from using the associated authentication challenge. For example, the authentication restriction 204e may lock a password, a PIN, or a fingerprint after a threshold number of unsuccessful responses; such that the user 201 may not use these authentication challenges to access the associated network resources and/or functionalities.

The factor restriction 204f may lock out accessibility associated with any authentication challenge that is associated with the authentication factor. For example, if the factor restriction 204f locks out inherence factors, all inherence authentication challenges such as fingerprint, voice, biometric, and face biometric will be locked. In some embodiments, the factors may be arranged based upon their security and significance; for example, a higher order factor may be more secure than a lower order factors. In such embodiments, if a higher order factor is locked, the lower order factor beneath the locked higher order factor may be locked as well. For example, if inherence factor is hierarchically higher than possession factor, unlocking inherence factor may unlock possession factor as well. The activity restriction 204g may lock one or more activities associated with network resources. For example, in a website, the user 201 may perform a number of activities such initiating a new chat or creating a new user account. Other non-limiting examples of the activities may include a service executed by a customer service representative on behalf of the user 201 or a service executed by the user 201 via a self-self-service channel. Non limiting examples of services include updating contact information, updating password/PIN, website registration, account balance check, and paying a bill. In response to one or more of the aforementioned counters exceeding a threshold, the system 200 may lock or restrict one or more associated activities.

The system 200 may also lock the user 201 from making multiple authentication attempts from different channels. For example, the user 201 may make a few login attempts through the internet channel and then switch to a mobile channel to make more login attempts. The system 200 may identity these multiple across channel attempts and lock the user 201 from one or more network resources. For instance, the system 200 may enable the account restriction 204b if the user 201 attempts to login to the existing account from a desktop based browser and then make a telephone call for additional login attempts, when the combined number of attempts exceeds a threshold number. In other words, the system 200 may also implement the counters 203 as cross-channel counters to keep track of login attempts across different channels.

The system 200 may lock an authentication method across all channels. For example, the user 201 may enter combinations of usernames and passwords to login to an account from a desktop based browser. When the system 200 determines that the number of entries (i.e., the number of attempts) has exceeded a threshold, the system 200 lock the authentication method of using username and password across all channels. The system 200 may not allow the user to authenticate using username and password through a mobile channel, e.g., may making a phone call to a computer-based voice processing system to verbally provide the username and password.

The system 200 may lock/restrict a particular type of factor based on the number of unsuccessful attempts using credentials of the type of factor. For example, the user 201 may attempt to authenticate himself by providing different knowledge factors such as passwords and PINs through one channel. The system 200 may maintain a counter for knowledge factors. Once the system 200 determines that the counter for knowledge factors for the user 201 has exceeded a threshold, the system 200 may lock knowledge factors for the user across all other channels. However, the system 200 may still make available possession factors (e.g., what the user 201 has) and inherent factors (e.g., what the user 201 is).

The system 200 may also maintain a counter (e.g., a session counter) for authentication attempts per session, irrespective of the type of authentication factors. For example, the user 201 may attempt a knowledge factor (also referred to as knowledge type) authenticator and may have two failed attempts. The user 201 may then successfully enter the knowledge factor authenticator and starts possession factors. The counter may reach a threshold for the authentication attempts for the current session and the system 200 may restrict the user 201 from logging into one or more network resources.

The system 200 may allow the user 201 to restrict a channel. For example, the user 201 may decide that he will never use the internet channel and the system 200 may restrict any access attempts from the internet channel for the user 201. In addition the user 201 may decide not to use a certain authenticator (e.g., a weak authenticator) and provide such indication to the system 200. The system 200 may in turn never prompt the user for the authenticator identified by the user.

The system 200 may maintain a profile counter for the user 201 and counters for each type of factors. In one embodiment, the user 201 may fail multiple attempts with a knowledge factor authenticator, successfully passes the authenticator (i.e., provides the correct authenticator), and then passes a possession factor authenticator. In response, the system 200 may reset the profile counter as well as the counters for each of the knowledge factor and possession factors.

It should be understood that the aforementioned restrictions or locks are merely illustrative, and other restrictions and locks are to be considered to be within the scope of this disclosure.

Figure 3:
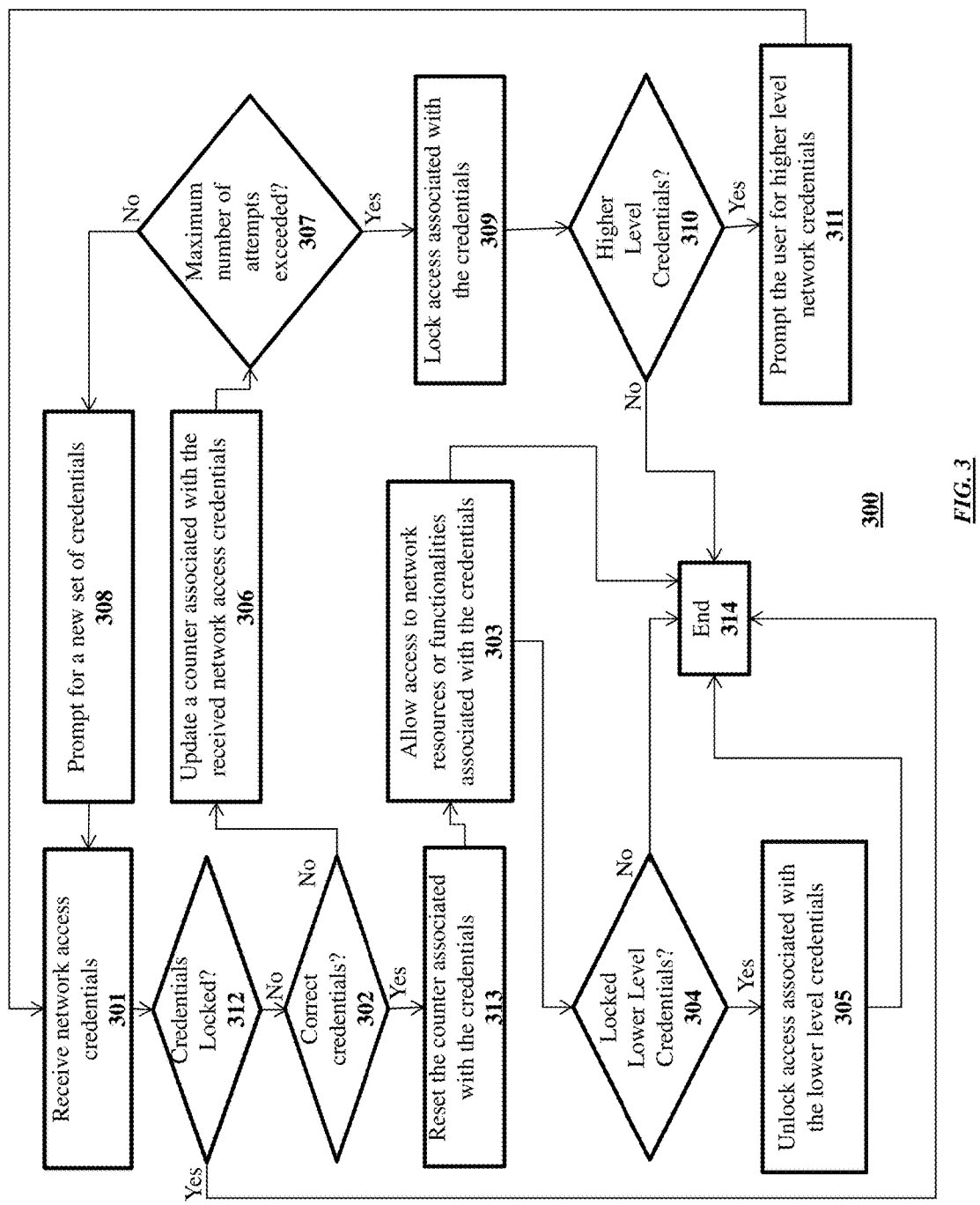
FIG. 3 shows an illustrative multi-challenge multi-level authentication method, according to an embodiment.

FIG. 3 shows an illustrative method 300 of multi-challenge multi-level authentication, according to an embodiment. Although one or more computing devices and one or more databases may implement one or more steps of the method 300, the following description details, for brevity, a computer system and a database implementing the steps of the method 300. It should be appreciated that some embodiments may comprise additional or alternative steps, or may omit several steps altogether. It should further be appreciated that locking a credential or locking an associated resource or functionality may be used interchangeably. In other words, when a credential is locked, an access to a network resource or functionality may be locked as well. Additionally, it should be understood that "network access credentials," "network credentials," and "credentials" may be used interchangeably, as in this disclosure.

In a first step 301, the computer system may receive network access credentials. For example, a user may attempt to login to a website using a username and a password. The network credentials may be associated with a level of access or a portion of the network resources that the user is trying to access. For instance, the network credentials may be associated with a specific level of access associated with the computer network resources.

Furthermore, the network credentials may be associated with a particular resource access. For example, the network credentials may be associated with transferring money from account to another. Furthermore, the network credentials may be associated with accessing an account. Also, the network credentials may be associated with doing a wire transfer. Alternatively, the network credentials may be associated with making a withdrawal from a user account. Furthermore, the network credentials may be associated with accessing the computer resources through a particular channel. It should be understood that these portions of access are merely illustrative, and other examples are to be considered within the scope of this invention.

In a next step 312, the computer system may determine whether the received credentials are locked, due to, for example, excessive incorrect attempts. If the computer system determines that the credentials are locked, the computer system may execute step 314 to end the process. Ending the process for locked credentials may allow the computer system to avoid, for example, a denial of service attack. However, if the computer system determines that the credentials are not locked, the computer system may execute next step 302, in which the computer system may determine whether the received network credentials are correct for the access level. To do so, the computer system may query the database to determine if the corresponding entries in the database match with the received network credentials. If the computer system determines that the network credentials are correct, the computer system may execute step 313. If the computer system determines that the credentials are not correct, the computer system may execute the step 306.

In the next step 306, which the computer system may execute if the computer system determines in step 302 that the credentials are not correct, the computer system may update in the database a counter associated with the received network credentials. For example, for each attempt, the computer system may advance the counter by one numeric value.

In a next step 307, the computer system may determine whether the maximum number of attempts has been exceeded based on the counter. For instance, the computer system may query the database to retrieve the maximum number of attempts associated with the received network credentials and compare the maximum number attempts with the existing number in the counter. If the computer system determines that the maximum number of attempts has not exceeded in step 307, the computer system may prompt the user for a new set of credentials in step 308 and execute a next iteration of the method 300.

If the computer system determines that the maximum number of attempts has been exceeded in step 307, the computer system may execute a next step 309. In step 309, the computer system may lock access associated with the received credentials. For example, if the user has attempted to access a bank account using a USB dongle for the maximum number of allowed attempts, the computer system may block access to the bank account using the USB dongle. In some embodiments, the computer system may lock access by other credentials that are at lower levels than the received credentials. For example, the USB dongle may be at a higher level than the user's alphanumeric password, and based on the determination that access attempts through the USB dongle has exceed the maximum number of attempts, the computer system may lock the password as well. In other embodiments, the computer system may not lock the lower level credentials and may only lock the network resources and functionalities.

In a next step 310, the computer system may determine based on a query of the database whether there are higher level credentials associated with the user. Continuing with the example of the USB dongle, a higher level credential compared to the USB dongle may be a fingerprint of the user. The user may input the fingerprint through a sensor at the user's computing device such as the user's laptop computer or smartphone. The higher level credential may be used to unlock lower level credentials and network resources and/or functionalities associated with the lower level credentials. In the step 310, if the computer system determines that the database does not have higher level credentials, the computer may execute step 312 and stop executing the method 300.

If however, the computer system determines that there are higher level credentials in the based on the query to the database, the computer system may execute step 311 and prompt the user for higher level network credentials. Once the computer system executes the step 311 to prompt the user for the higher level of network credentials, the process reverts back to the first step 301, wherein the computer system receives the network access credentials, at this point, at a higher level compared to the previous instance. In other words, if the computer system determines that there are higher level credentials, the computer system may execute a next iteration of the method 300.

However, if the computer system receives the correct credentials in step 302, the computer system may execute step 313 to reset the counter associated with the correct credentials. As the computer system has received the correct credentials, the counter may be reset to allow a maximum number of attempts for future authentication. After step 313, the computer system may execute step 303 to allow access to network resources or functionalities associated with the credentials. In some embodiments, the computer system may execute step 304 to check for whether there are locked lower level credentials. If in step 304, the computer system determines that there are locked lower level credentials, the computer system may execute step 305 to unlock access associated with the lower level credentials. At step 305, the computer may also reset the counters for the locked lower level credentials. After the computer system has unlocked access associated with the lower level credentials, the computer system may execute step 314 and end the process. If however, the computer system determines in step 304, that there are no locked lower level credentials, the computer system may execute step 314 to end the process skipping step 305. In some embodiments, the computer system may not check for locked lower level credentials and execute step 314 after step 303 to directly end the process skipping steps 304 and 305.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented authentication method comprising:
   receiving, by a computer, a first network access credential from a user device associated with a user attempting to access one or more network resources;
   in response to the computer determining that the first network access credential does not match a corresponding credential associated with the user stored in an authentication database:
      incrementing, by the computer, a first counter associated with the first network access credential and associated with the user;
      in response to the computer determining that the first counter has not exceeded that maximum number of attempts associated with the first network access credential and associated with the user:
         transmitting, by the computer, a prompt to the user device, wherein the prompt is configured to indicate to the user to enter a new first network access credential;
      in response to the computer determining that the first counter has exceeded the maximum number of attempts associated with the first network access credential and associated with the user:
         enabling, by the computer, a lock associated with the first network access credential to prohibit the user device from accessing the one or more network resources;
         querying, by the computer, the authentication database to determine whether the user is associated with a second network access credential;
         transmitting, by the computer, a prompt for the user to input the second network access credential in response to determining that the user is associated with the second network access credential; and
   in response to the computer determining that the first network access credential matches the corresponding credential associated with the user and stored in the authentication database:
      enabling, by the computer, the user device to access the one or more network resources.

2. The method of claim 1, further comprising:
   receiving, by the computer through the prompt, the second network access credential inputted by the user;
   in response to the computer determining that the second network access credential matches a corresponding credential associated with the user and stored in the authentication database:
      enabling, by the computer, the user device to access the one or more network resources; and
      resetting, by the computer, the first counter.

3. The method of claim 2, further comprising:
   in response to the computer determining that the second network access credential does not match the corresponding credential associated with the user and stored in the authentication database:

incrementing, by the computer, a second counter associated with the second network access credential and associated with the user;

in response to the computer determining that the second counter has not exceeded that maximum number of attempts associated with the second network access credential and associated with the user:

transmitting, by the computer, a prompt to the user device, wherein the prompt is configured to indicate to the user to enter a new second network access credential;

in response to the computer determining that the second counter has exceeded the maximum number of attempts associated with the second network access credential and associated with the user:

enabling, by the computer, a lock associated with the second network access credential to prohibit the user device from accessing the one or more network resources;

querying, by the computer, the authentication database to determine whether the user is associated with a third network access credential; and transmitting, by the computer, a prompt for the user to input the third network access credential in response to determining that the user is associated with the third network access credential.

4. The method of claim 3, wherein the second network access credential is at a higher level than the first network access credential and wherein the third network access credential is at a higher level than the second network access credential.

5. The method of claim 3, wherein each of the first and second network access credentials are associated with a type of authentication factor, the method further comprising:

in response to the computer determining that a fourth counter associated with the type of the authentication factor has exceeded the maximum number of attempts associated with the type of type of authentication factor:

enabling, by the computer, a lock associated with the type of the authentication factor across all channels.

6. The method of claim 3, further comprising:

incrementing, by the computer, a session counter in response to incrementing the first counter or the second counter during a current session; and in response to the computer determining that the session counter has exceeded the maximum number of authentication attempts with the current session;

enabling, by the computer, a lock associated with the session to restrict the user from further authentication attempts during the current session.

7. The method of claim 3, further comprising:

incrementing, by the computer, a profile counter associated with the user in response to incrementing the first counter or the second counter;

in response to the computer determining that the second network access credential matches the corresponding credential associated with the user and stored in the authentication database:

resetting, by the computer, the profile counter; and
resetting, by the computer, the first counter and the second counter.

8. The method of claim 1, further comprising:

in response to the computer determining that the first counter has exceeded the maximum number of attempts associated with the first network access credential and associated with the user:

enabling, by the computer, the lock associated with the first network access credential across all authentication channels.

9. The method of claim 1, further comprising:

enabling, by the computer, a channel lock associated with an authentication channel in response to the computer receiving a channel lock indication from the user.

10. The method of claim 1, further comprising:

enabling, by the computer, an authenticator lock associated with an authenticator in response to the computer receiving an authenticator lock indication from the user.

11. A system comprising:

a non-transitory storage storing an authentication database;

a processor electrically coupled to the non-transitory storage medium and configured to:

receive a first network access credential from a user device associated with a user attempting to access one or more network resources;

in response to the processor determining that the first network access credential does not match a corresponding credential associated with the user stored in the authentication database:

increment a first counter associated with the first network access credential and associated with the user;

in response to the processor determining that the first counter has not exceeded that maximum number of attempts associated with the first network access credential and associated with the user:

transmit a prompt to the user device, wherein the prompt is configured to indicate to the user to enter a new first network access credential;

in response to the processor determining that the first counter has exceeded the maximum number of attempts associated with the first network access credential and associated with the user:

enable a lock associated with the first network access credential to prohibit the user device from accessing the one or more network resources;

query the authentication database to determine whether the user is associated with a second network access credential;

transmit a prompt for the user to input the second network access credential in response to determining that the user is associated with the second network access credential; and in response to the processor determining that the first network access credential matches the corresponding credential associated with the user and stored in the authentication database:

enable the user device to access the one or more network resources.

12. The system of claim 11, wherein the processor is further configured to:

receive through the prompt, the second network access credential inputted by the user;

in response to the processor determining that the second network access credential matches a corresponding credential associated with the user and stored in the authentication database:

enable the user device to access the one or more network resources; and reset the first counter.

13. The system of claim 12, wherein the processor is further configured to:
in response to the processor determining that the second network access credential does not match the corresponding credential associated with the user and stored in the authentication database:
increment a second counter associated with the second network access credential and associated with the user;
in response to the processor determining that the second counter has not exceeded that maximum number of attempts associated with the second network access credential and associated with the user:
transmit a prompt to the user device, wherein the prompt is configured to indicate to the user to enter a new second network access credential;
in response to the processor determining that the second counter has exceeded the maximum number of attempts associated with the second network access credential and associated with the user:
enable a lock associated with the second network access credential to prohibit the user device from accessing the one or more network resources;
query the authentication database to determine whether the user is associated with a third network access credential; and
transmit a prompt for the user to input the third network access credential in response to determining that the user is associated with the third network access credential.

14. The system of claim 13, wherein the second network access credential is at a higher level than the first network access credential and wherein the third network access credential is at a higher level than the second network access credential.

15. The system of claim 13, wherein each of the first and second network access credentials are associated with a type of authentication factor, and wherein the processor is further configured to:
in response to the processor determining that a fourth counter associated with the type of the authentication factor has exceeded the maximum number of attempts associated with the type of type of authentication factor:
enable a lock associated with the type of the authentication factor across all channels.

16. The system of claim 13, wherein the processor is further configured to:
increment a session counter in response to incrementing the first counter or the second counter during a current session; and
in response to the processor determining that the session counter has exceeded the maximum number of authentication attempts with the current session;
enable a lock associated with the session to restrict the user from further authentication attempts during the current session.

17. The system of claim 13, wherein the processor is further configured to:
increment a profile counter associated with the user in response to incrementing the first counter or the second counter;
in response to the processor determining that the second network access credential matches the corresponding credential associated with the user and stored in the authentication database:
reset the profile counter; and
reset the first counter and the second counter.

18. The system of claim 11, wherein the processor is further configured to:
in response to the processor determining that the first counter has exceeded the maximum number of attempts associated with the first network access credential and associated with the user:
enable the lock associated with the first network access credential across all authentication channels.

19. The system of claim 11, wherein the processor is further configured to:
enable a channel lock associated with an authentication channel in response the processor to receiving a channel lock indication from the user.

20. The system of claim 11, wherein the processor is further configured to:
enable an authenticator lock associated with an authenticator in response to the processor receiving an authenticator lock indication from the user.

* * * * *